United States Patent
Jiang (10) Patent No.: US 10,571,593 B2
(45) Date of Patent: Feb. 25, 2020

(54) METHOD FOR ANALYSING MEASUREMENT SIGNAL OF METAL SENSOR AND DETECTING OBJECT VIA METAL SENSOR

(71) Applicant: JINHUA MAKA TECHNOLOGY CO., LTD, Yongkang, Zhejiang (CN)

(72) Inventor: Hongzhou Jiang, Yongkang (CN)

(73) Assignee: JINHUA MAKA TECHNOLOGY CO., LTD, Yongkang, Zhejiang (CN)

( * ) Notice: Subject to any disclaimer, the term of this patent is extended or adjusted under 35 U.S.C. 154(b) by 141 days.

(21) Appl. No.: 15/738,364

(22) PCT Filed: Aug. 18, 2015

(86) PCT No.: PCT/CN2015/087328
§ 371 (c)(1),
(2) Date: Dec. 20, 2017

(87) PCT Pub. No.: WO2017/015998
PCT Pub. Date: Feb. 2, 2017

(65) Prior Publication Data
US 2018/0172870 A1    Jun. 21, 2018

(30) Foreign Application Priority Data

Jul. 29, 2015    (CN) .......................... 2015 1 0454543

(51) Int. Cl.
*G01V 3/10*    (2006.01)
*G01V 3/38*    (2006.01)

(52) U.S. Cl.
CPC ................ *G01V 3/107* (2013.01); *G01V 3/38* (2013.01)

(58) Field of Classification Search
USPC .................................................. 324/326–329
See application file for complete search history.

(56) References Cited

U.S. PATENT DOCUMENTS

2008/0303517 A1* 12/2008 Skultety-Betz ........ G01V 3/104
324/234
2014/0300351 A1* 10/2014 Hahl ...................... G01V 3/107
324/259

* cited by examiner

*Primary Examiner* — Jay Patidar
(74) *Attorney, Agent, or Firm* — Li & Cai Intellectual Property (USA) Office (57) ABSTRACT

A metal sensor, a method for analyzing a measurement signal of the sensor, and a method for detecting an object surrounded by a medium via the sensor. The metal sensor has at least one transmission coil and at least one receiving coil system inductively coupled to each other, wherein the receiving coil system comprises at least one first receiving coil and at least one second receiving coil located in a same plane; the transmission coil forms a projection on the plane; an area formed by the first receiving coil on the plane contains the projection; and an area formed by the second receiving coil on the plane is arranged around the projection. The receiving coils are arranged to have a same winding direction, produce induction with a second magnetic field generated by a target metal object, and generate induced voltages superimposed on one another other on the receiving coils.

15 Claims, 9 Drawing Sheets

METHOD FOR ANALYSING MEASUREMENT SIGNAL OF METAL SENSOR AND DETECTING OBJECT VIA METAL SENSOR

BACKGROUND OF THE INVENTION

1. Field of the Invention

The present invention relates to detection and locating, and in particular, to a sensor, a method for analyzing a measurement signal of the sensor, and a method for detecting an object via the sensor.

2. Description of Related Art

Metal detectors are mainly used to locate metal objects. There are various types of existing detectors that operate according to multiple principles. For example, a main component of a metal detector is a sensor, and the sensor is composed of coils. A transmission coil is used to transmit a continuous alternating field. The alternating field is received by a receiving coil. Relative to the transmission coil, the receiving coil is disposed in a way that where there is no impact by an object to be detected, induced voltages generated on the receiving coil are canceled with each other to make an induced voltage output close to 0, and where there is an impact by an object to be detected, the object to be detected will change the original alternating field. More precisely, the object to be detected generates another alternating field. This alternating field may be transferred to the receiving coil, and generates an induced voltage on the receiving coil. The induced voltage is amplified and correspondingly analyzed.

Figure 1:
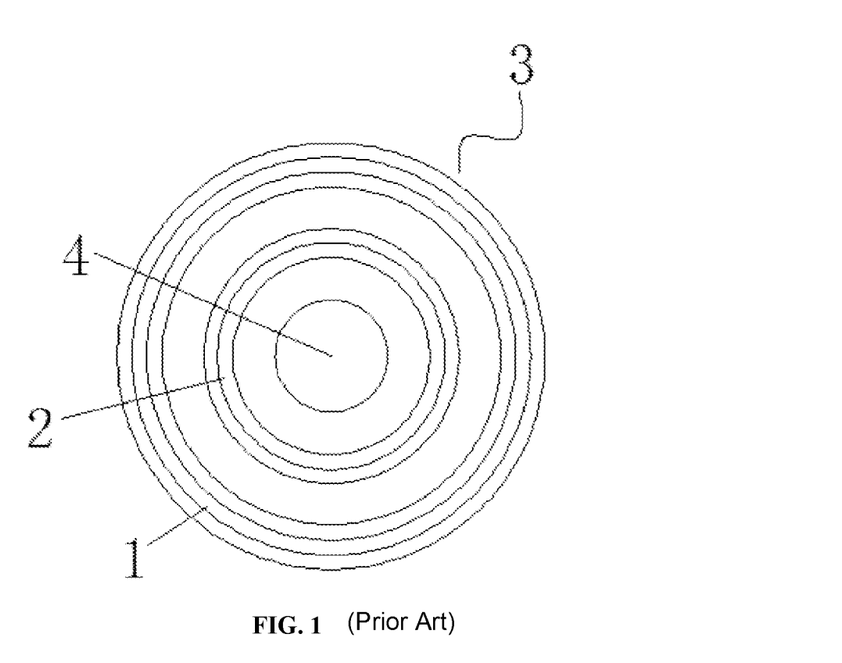
FIG. 1 is a schematic structural diagram of a metal sensor in the prior art.

FIG. 1 is a schematic structural diagram of a sensor in the prior art. A geometrical structure of the sensor is that: a receiving coil system is composed of a first receiver loop 1 and a second receiver loop 2 in opposite directions, the first receiver loop 1 and the second receiver loop 2 are coaxially disposed in a common plane 3, a transmitter coil 4 is located at a particular distance z over the common receiver plane 3, and the transmitter coil is also disposed coaxially with the first receiver loop 1 and the second receiver loop 2. In this example, if a winding of the first receiver loop 1 is disposed to be wound in a clockwise direction, then a winding of the second receiver loop 2 will be wound in a counterclockwise direction, so that voltages induced in these windings have opposite signs and can compensate each other in an absence of an external target object after appropriate sizing, and no induced voltage is output. The use of such a sensor to locate an object has the following defects. (1) Since a transmission coil generates a huge alternating field, and a reverse field generated through induction by an object under detection is extremely weak, during detection of an extremely weak alternating field generated by the object under detection, a receiving coil is required to ignore the huge alternating field generated by the transmission coil, so that the receiving coil is not inductively coupled to the transmission coil. In a coil layout in the prior art, the first receiver loop 1 and the second receiver loop 2 are required to have opposite winding directions. In this case, an alternating field generated by a target object is inevitably canceled, and as a result, the sensitivity of detection is reduced. When a target object is at a specific location, a voltage induced in the receiving coil by a second magnetic field is in a state of being completely canceled. Consequently, a blind zone for measurement is formed, and the target object fails to be detected; however, the target object exists in practice. That is, a blind spot for measurement or an area with minimum sensitivity exists. (2) Because a first coil and a second coil are coaxial and have different radii, the change of a magnetic flux is mainly effected by changing an area. For a relatively large range of compensation, a radius difference between two coils cannot be too small, and this can only be effected by increasing the size of a circuit board. As a result, the circuit board space is necessarily occupied.

SUMMARY OF THE INVENTION

The present invention, for the deficiencies in the prior art, provides a metal sensor. Receiving coils are disposed to have a same winding direction, produce induction with a second magnetic field generated by a target metal object, and generate induced voltages superimposed on each other on the receiving coils. The present invention can improve the sensitivity to a target object, and will not form a blind zone for measurement, thereby significantly improving the measurement accuracy.

To solve the foregoing technical problem, the present invention adapts the following technical solution.

A metal sensor has at least one transmission coil and at least one receiving coil system inductively coupled to each other. The receiving coil system includes at least one first receiving coil and at least one second receiving coil located in a same plane. The transmission coil forms a projection on the plane. An area formed by the first receiving coil on the plane contains the projection, and an area formed by the second receiving coil on the plane is disposed around the projection. The first receiving coil is electrically connected to the second receiving coil.

Preferably, the area formed by the first receiving coil on the plane completely contains the projection.

Preferably, the area formed by the first receiving coil on the plane partially contains the projection.

Preferably, one area is formed by the second receiving coil on the plane, and the area surrounds the projection with an opening.

Preferably, at least two areas are formed by the second receiving coil on the plane, and the areas are sequentially distributed around the projection.

Further, one output stage is disposed respectively on the first receiving coil and/or the second receiving coil and/or a connecting line between the first receiving coil and the second receiving coil.

Further, at least two output stages are disposed on the first receiving coil, and at least two output stages are disposed on the second receiving coil.

Further, a switch device is included, and the output stages on the first receiving coil and the second receiving coil are respectively connected to the switch device.

Further, the switch device is an MOS transistor or a bipolar transistor.

Further, an analysis circuit is included, and the output stages of the receiving coil system are connected to the analysis circuit via the switch device.

Further, an analysis circuit is included, and the output stages of the receiving coil system are connected to the analysis circuit.

Further, the analysis circuit includes an operational amplifier and a processor.

Further, the transmission coil is embedded in a printed circuit board.

Further, at least two positioning holes for fixedly installing the transmission coil are disposed on the printed circuit board. A method for analyzing a measurement signal of the sensor is provided. An excitation signal with a frequency F1 is digitally generated, and phase-synchronized analog/digital conversion is performed on an output signal of a measurement amplifier of an analysis circuit of the sensor and a conversion signal is output. Data about whether there is a target is analyzed, when there is no target object, spectral analysis is performed on the conversion signal, to obtain a vector signal A having a frequency F1, when there is a target object, spectral analysis is performed on the conversion signal, to obtain a vector signal B having a frequency F1, and the vector signal A is subtracted from the vector signal B to obtain a new vector signal C.

Further, when an amplitude of the vector signal C is greater than a set threshold, a phase of the vector signal C is analyzed, when the phase of the vector signal C is in a first phase interval, a determining signal is output showing that a metal object exists in a medium, and two end values of the first phase interval are respectively phase values of the vector signal C when an object to be detected is a metal with maximum magnetic conductivity and a metal with minimum magnetic conductivity.

Further, when the amplitude of the vector signal C is greater than the set threshold, the phase of the vector signal C is analyzed, when the phase of the vector signal C is in a second phase interval, a determining signal is output showing that a magnetic metal object exists in the medium, and two end values of the second phase interval are respectively phase values of the vector signal C when the object to be detected is a magnetic metal with maximum magnetic conductivity and a magnetic metal with minimum magnetic conductivity; and when the phase of the vector signal C is in a third phase interval, a determining signal is output showing that an object in the medium is a nonmagnetic metal, and two end values of the third phase interval are respectively phase values of the vector signal C when the object to be detected is a nonmagnetic metal with maximum magnetic conductivity and a nonmagnetic metal with minimum magnetic conductivity.

Further, an amplitude change of the vector signal C is analyzed, plane locations 1 and 2 of a first peak value and a second peak value in the amplitude change of the vector signal C are recorded, and midpoint location information of the plane locations 1 and 2 is output as approximate location information of the object in the medium.

Further, an amplitude change of the vector signal C is analyzed, plane locations 1 and 2 of a first peak value and a second peak value in the amplitude change of the vector signal C are recorded, and midpoint location information of the plane locations 1 and 2 is output as approximate location information of the object in the medium.

A method for detecting an object surrounded by a medium via the sensor is provided. A measurement signal is analyzed to obtain property and location information of a surrounded object, the measurement signal is a vector signal obtained through subtraction of a signal generated by a receiving coil end when the sensor is in a detection state and a preset signal, and the preset signal is a signal generated by the receiving coil end of the sensor when no object exists.

Further, when an amplitude of the vector signal C is greater than a set threshold, a phase of the vector signal C is analyzed, when the phase of the vector signal C is in a first phase interval, a determining signal is output showing that a metal object exists in a medium, and two end values of the first phase interval are respectively phase values of the vector signal C when an object to be detected is a metal with maximum magnetic conductivity and metal with a minimum magnetic conductivity.

Further, when the amplitude of the vector signal C is greater than the set threshold, the phase of the vector signal C is analyzed, when the phase of the vector signal C is in a second phase interval, a determining signal is output showing that a magnetic metal object exists in the medium, and two end values of the second phase interval are respectively phase values of the vector signal C when the object to be detected is a magnetic metal with maximum magnetic conductivity and a magnetic metal with minimum magnetic conductivity; and when the phase of the vector signal C is in a third phase interval, a determining signal is output showing that an object in the medium is a nonmagnetic metal, and two end values of the third phase interval are respectively phase values of the vector signal C when the object to be detected is a nonmagnetic metal with maximum magnetic conductivity and a nonmagnetic metal with minimum magnetic conductivity.

Further, an amplitude change of the vector signal C is analyzed, plane locations 1 and 2 of a first peak value and a second peak value in the amplitude change of the vector signal C are recorded, and midpoint location information of the plane locations 1 and 2 is output as approximate location information of the object in the medium.

A measurement device includes the foregoing sensor.

Further, the measurement device is a handheld locating device.

The present invention achieves the following advantageous effects.

For a second magnetic field generated by a target object, because coils have a same winding direction, induced electromotive forces generated by the coils are superimposed on each other. Therefore, the induction sensitivity of a receiving coil to a magnetic field of the target object is enhanced, and a blind zone for measurement is not formed, thereby significantly improving the measurement accuracy. In addition, a first receiving coil and a second receiving coil are disposed on a circuit board, and receiving coils with external windings have very high accuracy of locations which currently may reach 0.1 mm and more, thereby significantly improving the consistency of products, and facilitating cancellation of an induced voltage generated by a first magnetic field, and costs can be reduced when receiving coils are disposed on a circuit board.

Additional aspects and advantages of the present invention will be partially given in the following description, and will partially become apparent from the following description or be understood from the practice of the present invention.

BRIEF DESCRIPTION OF THE DRAWINGS

The accompanying drawings are included to provide a further understanding of the invention and constitute a part of this application. The exemplary embodiments and description thereof of the invention serve to explain the present invention and are not intended to limit the invention in any way.

In the drawings.

DETAILED DESCRIPTION OF THE PREFERRED EMBODIMENTS

In order to make the objectives, technical solutions, and advantages of embodiments of the present invention clearer, the technical solutions of embodiments of the present invention are clearly and completely described below with reference to the accompanying drawings of embodiments of the present invention. Apparently, the embodiments described are merely some, rather than all embodiments of the present invention. Based on the described embodiments of the present invention, all other embodiments obtained by persons of ordinary skill in the art without making creative efforts shall fall within the protection scope of the present invention.

In the description of the present invention, it is to be understood that orientation or positional relations indicated by terms "center", "longitudinal", "transverse", "length", "width", "thickness", "up", "down", "front", "rear", "left", "right", "vertical", "horizontal", "top", "bottom", "inner", "outer", "clockwise", "counter-clockwise" and the like are based on those shown in the accompanying drawings, and they are only intended to facilitate and simplify the description of the present invention, rather than indicating or implying that a device or element indicated by the terms must have a particular orientation, or must be configured and operated at a particular orientation, and thus should not be construed as limiting the present invention.

In the description of the present invention, unless explicitly specified and defined otherwise, terms "mount", "connect", "connection", "fix" and the like should be interpreted in a broad sense, and may be, for example, a fixed connection, removable connection or integral connection; may also be a mechanical connection or electrical connection; may be a direct connection or indirect connection via an intermediate medium; may also be communication between interiors of two elements. Those of ordinary skill in the art may understand specific meanings of the above-mentioned terms in the present invention according to specific situations.

In the present invention, unless explicitly specified and defined otherwise, a first feature being "above" or "below" a second feature may include the first feature and the second feature being in direct contact, and may also include the first feature and the second feature being in non-direct contact via another feature therebetween. Further, the first feature being "over", "above" or "on the top of" the second feature includes the first feature being directly above and obliquely above the second feature, or merely indicates the horizontal height of the first feature being higher than that of the second feature. The first feature being "under", "below" or "underneath" the second feature includes the first feature being directly below and obliquely below the second feature, or merely indicates that the horizontal height of the first feature is lower than that of the second feature.

Unless defined otherwise, all technical and scientific terms used herein have the same meanings as commonly understood by one of ordinary skill in the art to which the present invention belongs. The terms "first", "second", and the like herein in the description and in the claims do not denote any order, quantity, or importance, but rather are used to distinguish one element from another. Similarly, the use of the terms a, an, etc. do not denote a limitation of quantity, but rather denote the presence of at least one of the referenced item.

It is well known to those skilled in the art that the term "field lines" should not be understood literally, because to some extent, the "field lines" only simply represent areas with the same magnetic strength and polarity. For this reason, in the following description of the present invention, this term is used to represent magnetic density. For better description, only one winding is used to represent a coil. It will be easily understood that in the present invention, it is considered that a starting coil has multiple windings, or coils are "printed" on a board.

Figure 2:
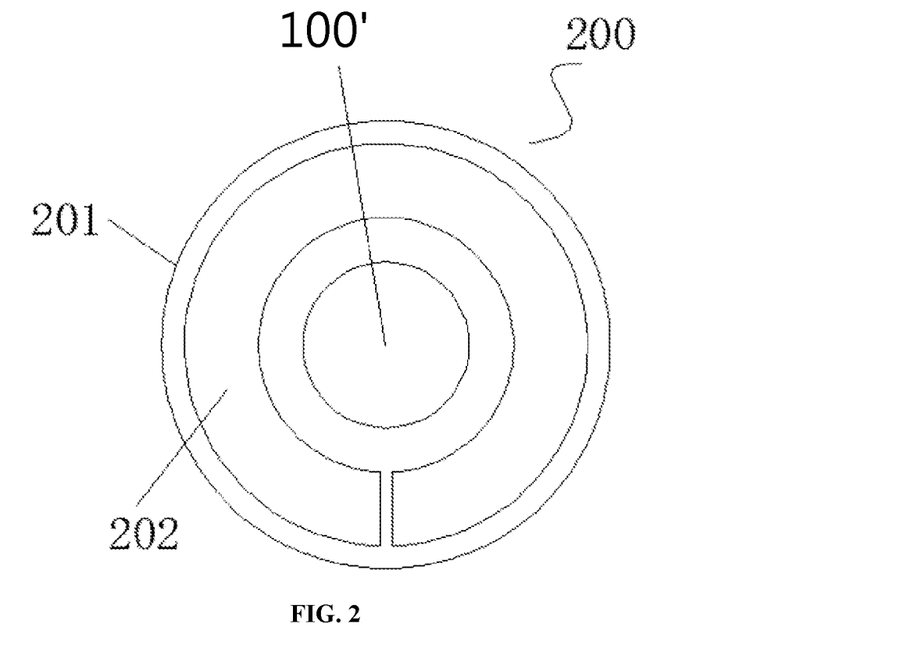
FIG. 2 is a schematic structural diagram according to Embodiment 1 of a metal sensor of the present invention.

As an embodiment of the present invention, as shown in FIG. 2, a greatly simplified principle diagram shows a first embodiment of a sensor geometrical structure of a sensor for locating a metal object in the present invention. A metal sensor has a transmission coil 100 and a receiving coil system 200 inductively coupled to each other. In this embodiment, one transmission coil 100 and one receiving coil system 200 are used as an example for description. However, the sensor in the present invention is not limited thereto. The receiving coil system 200 in the present invention includes one first receiving coil 201 and one second receiving coil 202 located in a same plane. The transmission coil 100 forms a projection 100' on the plane. An area formed by the first receiving coil 201 on the plane completely contains the projection, or may also partially contain the projection. One area is formed by the second receiving coil 202 on the plane, and the area surrounds the projection with an opening. The first receiving coil 201 is electrically connected to the second receiving coil 202. Similarly, the receiving coil system 200 is not limited to including one first receiving coil 201 and one second receiving coil 202 located in a same plane, and may include two or more first and second receiving coils.

Figure 3:
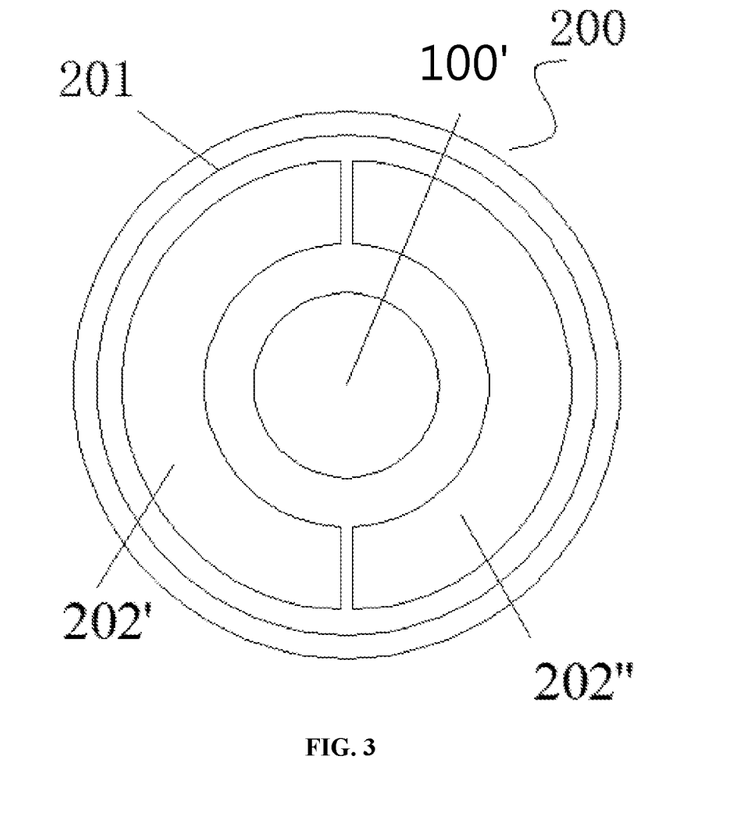
FIG. 3 is a schematic structural diagram according to Embodiment 2 of the metal sensor of the present invention.

As an embodiment of the present invention, as shown in FIG. 3, a greatly simplified principle diagram shows a second embodiment of a sensor geometrical structure of a sensor for locating a metal object in the present invention. A metal sensor has a transmission coil 100 and a receiving coil system 200 inductively coupled to each other. In this embodiment, one transmission coil 100 and one receiving coil system 200 are used as an example for description. However, the sensor in the present invention is not limited thereto. The receiving coil system 200 in the present invention includes one first receiving coil 201 and one second receiving coil 202 located in a same plane. The transmission coil 100 forms a projection 100' on the plane. An area formed by the first receiving coil 201 on the plane completely contains the projection, or may also partially contain the projection. For the second receiving coil 202, two areas are formed on the plane by second receiving coils (202', 202"), and the areas are sequentially distributed around the projection. The first receiving coil 201 is electrically connected to the second receiving coils (202', 202"). Similarly, the receiving coil system 200 is not limited to including one first receiving coil 201 and two second receiving coils (202', 202") located in a same plane, and may include three or more first and second receiving coils.

In this embodiment, as shown in FIG. 3, an optimal layout is that a group of the second receiving coils (202', 202") are distributed symmetrically about the transmission coil 100. Various factors such as humidity and temperature affect a magnetic field of the transmission coil 100, and the symmetrical distribution is helpful to neutralize such impact, although neutralization of such impact may also be effected with an asymmetrical distribution. During specific implementation, the sensitivity of measurement can be improved when the number of turns in the receiving coil system such as the first receiving coil 201 or the second receiving coil (202, 202', 202") and the area included by the coils are increased while maintaining the balance of induced voltages.

The transmission coil 100 in this embodiment may be located at a particular distance over the common receiving plane, and is disposed in parallel with the receiving coil system 200. At least two positioning holes for fixedly installing the transmission coil 100 are disposed on a printed circuit board, and pins of the transmission coil 100 are inserted in the positioning holes and are welded on the circuit board. The transmission coil 100 may also be a lead structure directly disposed on a printed circuit board or be embedded in the printed circuit board.

Figure 4:
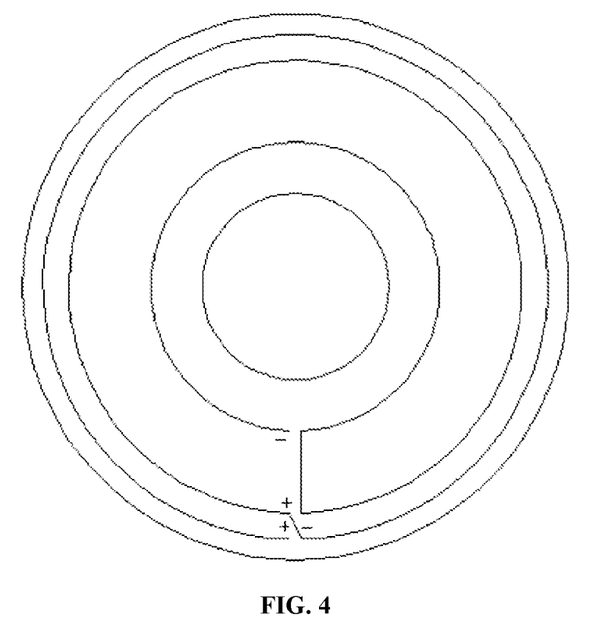
FIG. 4 is a schematic diagram of connection of a receiving coil system according to Embodiment 1 of the metal sensor of the present invention.
Figure 5:
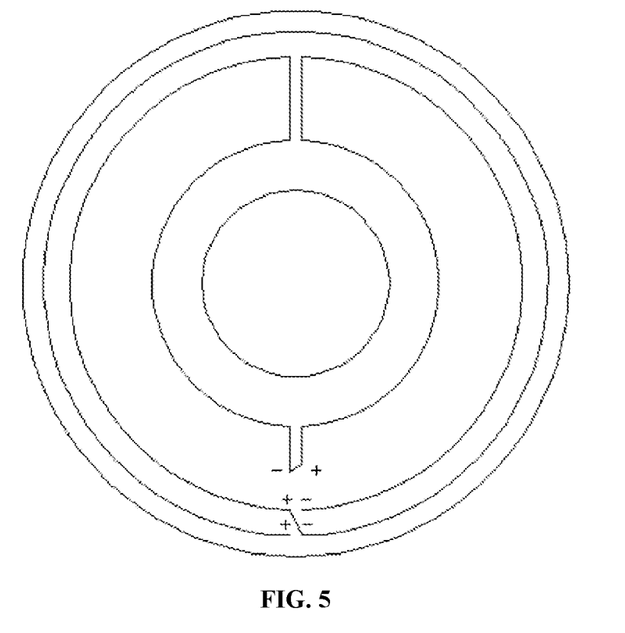
FIG. 5 is a schematic diagram of connection of a receiving coil system according to Embodiment 2 of the metal sensor of the present invention.

In the present invention, the first receiving coil 201 and the second receiving coil 202 have a same winding direction. For a connection according to Embodiment 1, as shown in FIG. 4, a positive electrode of an induced voltage of the first receiving coil 201 is connected to a negative electrode of an induced voltage of the second receiving coil 202. In this way, the induced voltages of the two coils may be added. Similarly, a connection according to Embodiment 2 is shown in FIG. 5. As can be seen, voltages induced in the receiving coils by a first magnetic field can be canceled by this connection, and voltages induced by a second magnetic field are superimposed. Therefore, not only the induced voltage induced by the first magnetic field can be canceled, but also the induced voltage induced by the second magnetic field can be increased, thereby significantly improving the sensitivity of detection.

Figure 6:
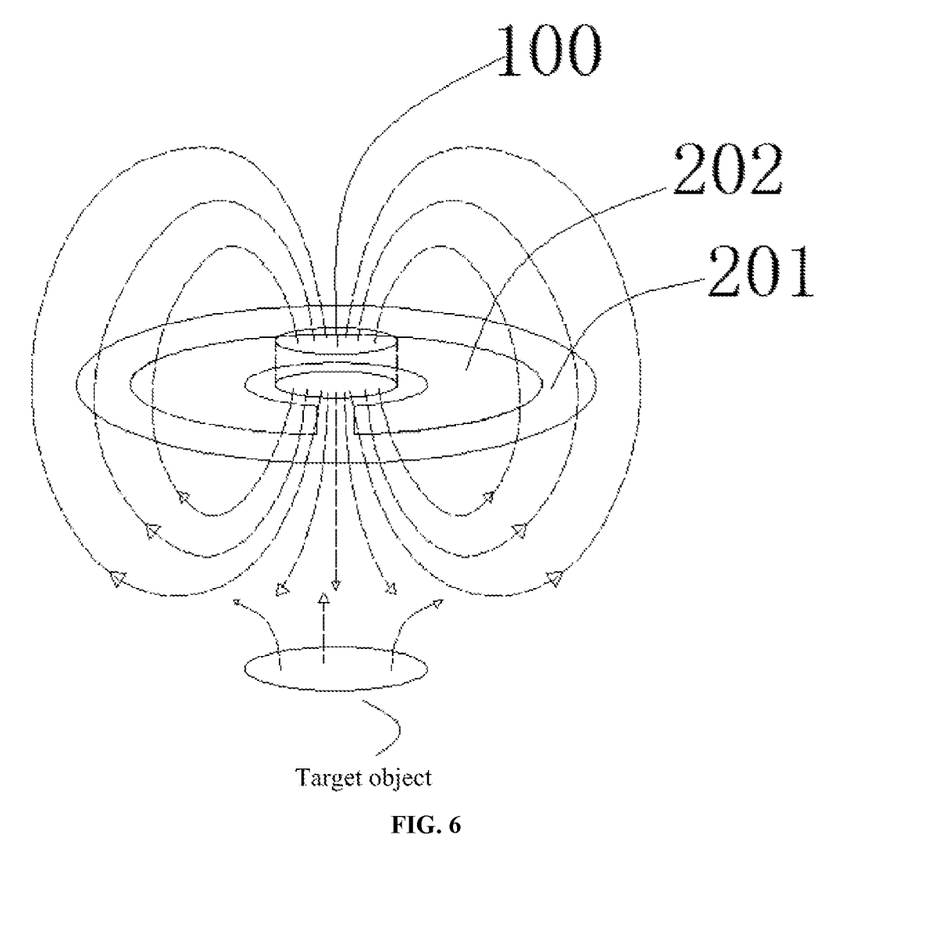
FIG. 6 is a principle diagram of a geometrical structure according to Embodiment 1 of the metal sensor of the present invention.
Figure 7:
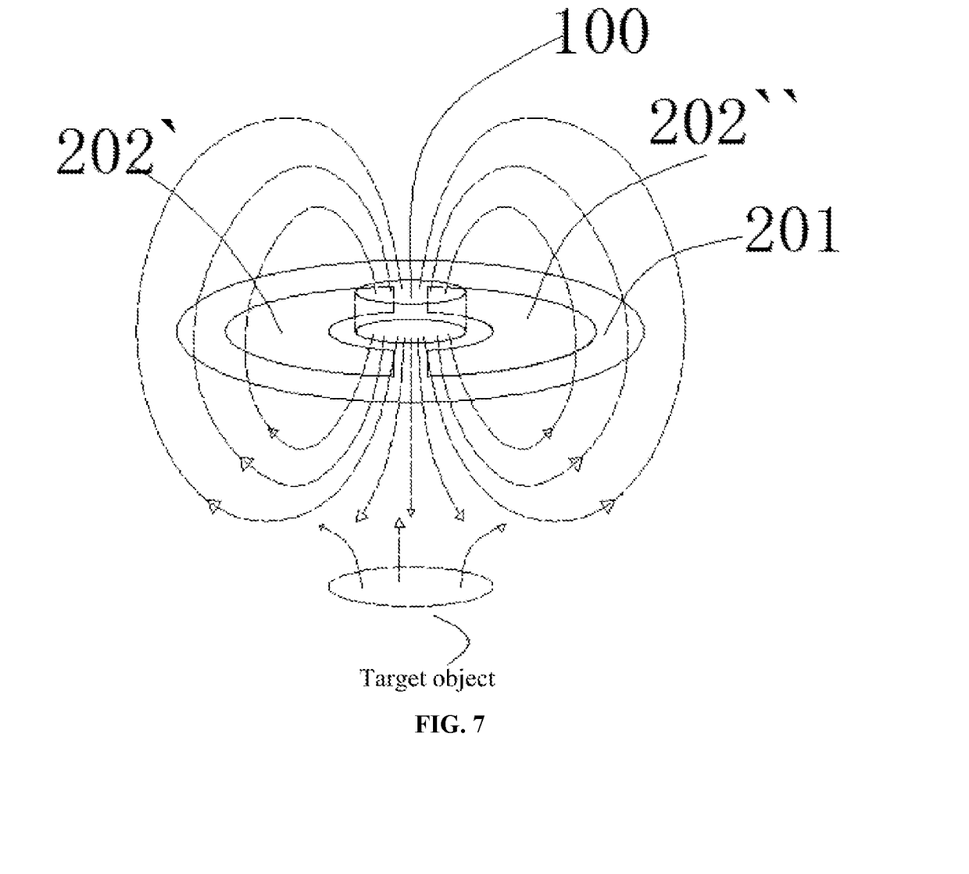
FIG. 7 is a principle diagram of a geometrical structure according to Embodiment 2 of the metal sensor of the present invention.

As shown in FIG. 6 and FIG. 7, for a second magnetic field generated by a target object, the induced voltage is based on the equation $E=n\Delta\Phi/\Delta t$, where E is an induced electromotive force (V), n is the number of turns of an inductive coil, and $\Delta\Phi/\Delta t$ is a change rate of magnetic flux. Because coils have a same winding direction, induced electromotive forces generated by the coils are superimposed on each other. Therefore, the induction sensitivity of a receiving coil to a magnetic field of the target object is enhanced, and a blind zone for measurement is not formed, thereby significantly improving the measurement accuracy. In addition, a first receiving coil and a second receiving coil are disposed on a circuit board, and receiving coils with external windings have very high accuracy of locations which currently may reach 0.1 mm and more, thereby significantly improving the consistency of products, and facilitating cancellation of an induced voltage generated by a first magnetic field, and costs can be reduced when receiving coils are disposed on a circuit board.

Figure 8:
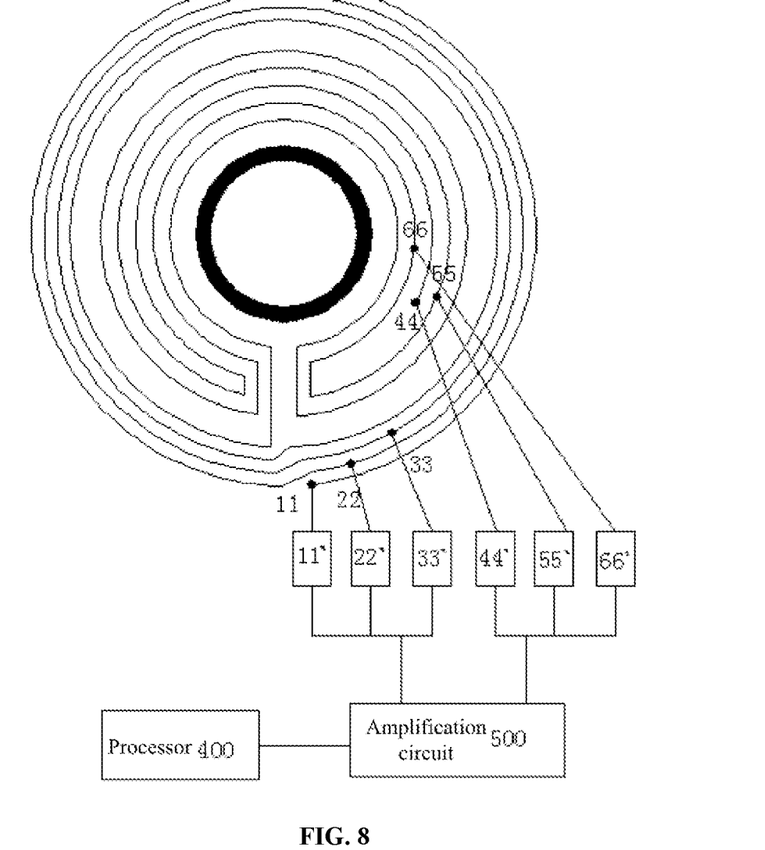
FIG. 8 is a schematic diagram of detection according to Embodiment 1 of the metal sensor of the present invention.

In this embodiment, as shown in FIG. 8, a black dot in the figure represents a connecting point, that is, an output stage. An output stage is generally disposed at a start and an end of a coil. In the figure, at least one connecting point is generally disposed on the first receiving coil 201. If one connecting point is disposed, the connecting point is usually disposed at a start location of the coil. When more points are disposed, a range of calibration may be larger. Generally, three points are preferably disposed. According to Embodiment 1, three output stages (11, 22, 33) are disposed on the first receiving coil 201. When a gap between locations of the output stages is smaller, the accuracy of calibration is higher. Generally, the gap between the output stages is preferably about one turn, and the gaps are kept consistent. In the figure, at least one connecting point is generally disposed on the second receiving coil 202. If one connecting point is disposed, the connecting point may be disposed at an end location of the coil. Generally, about 3 to 10 connecting points are disposed. According to Embodiment 1, three output stages (44, 55, 66) are disposed on the second receiving coil 202. For a better calibration effect, a connecting point of an output stage may be disposed at a location satisfying the following condition: when no metal exists, an induced voltage between output stages that are farthest away from each other on the second receiving coil is substantially equal to an induced voltage between two output stages that are closest to each other on the first receiving coil; or an induced voltage between output stages that are farthest away from each other on the first receiving coil is substantially equal to an induced voltage between two output stages that are closest to each other on the second receiving coil. When a gap between locations of connecting points on the second receiving coil is smaller, the accuracy of calibration is higher. In this case, more connecting points are needed. Generally, the gap between the output stages is preferably about one turn, and gaps are kept consistent.

The three output stages (11, 22, 33) on the first receiving coil 201 are respectively electrically connected to one ends of switch devices (11', 22', 33'), and the other ends of the three switch devices are electrically connected to an input terminal of an amplification circuit 500. An output terminal of the amplification circuit 500 is connected to a processor 400. The switch device in this embodiment is generally an MOS transistor or a bipolar transistor. The processor 400 controls the switch device to be turned off or turned on. For an amplifier in this embodiment, an operational amplifier having high input impedance, low noise, and low temperature drift is generally selected.

Similarly, the three output stages (44, 55, 66) on the second receiving coil 202 are respectively electrically connected to one ends of switch devices (44', 55', 66'), and other ends of the three switch devices are electrically connected to the input terminal of the amplification circuit 500. The output terminal of the amplification circuit 500 is connected to the processor 400.

The apparatus is operated when no object to be located exists. The processor 400 controls the output stages, and sequentially detects amplitudes of output signals of the output stages via the switch devices, and stores switch device setting information. The switch device setting information is on/off status information of the switch devices corresponding to an output signal with a minimum amplitude that is selected by comparing the amplitudes of the output signals. The processor 400 controls, according to the switch device setting information, the switch devices to be turned on or turned off. Thus, the apparatus is operated to locate an object.

A process of specific implementation is as follows.

When no object exists, the transmission coil 100 is driven to generate an alternating magnetic field, and the processor 400 detects the amplitude of an output signal of the amplification circuit 500:

turning on the switch device 11' and the switch device 44', and turning off the rest switch devices, to detect an amplitude A1 of an output signal of the amplification circuit 500;

turning on the switch device 11' and the switch device 55', and turning off the rest switch devices, to detect an amplitude A2 of an output signal of the amplification circuit 500;

turning on the switch device 11' and the switch device 66', and turning off the rest switch devices, to detect an amplitude A3 of an output signal of the amplification circuit 500;

turning on the switch device 22' and the switch device 44', and turning off the rest switch devices, to detect an amplitude B1 of an output signal of the amplification circuit 500;

turning on the switch device 22' and the switch device 55', and turning off the rest switch devices, to detect an amplitude B2 of an output signal of the amplification circuit 500;

turning on the switch device 22' and the switch device 66', and turning off the rest switch devices, to detect an amplitude B3 of an output signal of the amplification circuit 500;

turning on the switch device 33' and the switch device 44', and turning off the rest switch devices, to detect an amplitude C1 of an output signal of the amplification circuit 500;

turning on the switch device 33' and the switch device 55', and turning off the rest switch devices, to detect an amplitude C2 of an output signal of the amplification circuit 500; and turning on the switch device 33' and the switch device 66', and turning off the rest switch devices, to detect an amplitude C3 of an output signal of the amplification circuit 500.

The minimum amplitude is calculated, a status of a corresponding switch device is obtained, and the status is stored in a nonvolatile memory. In a next operation, the processor 400 directly reads a status of a switch from the nonvolatile memory, thereby significantly improving the sensitivity in detecting a target object. The status of the switch device in this embodiment has n*m states, where n is the number of connecting points on the first receiving coil, and m is the number of connecting points on the second receiving coil.

Figure 9:
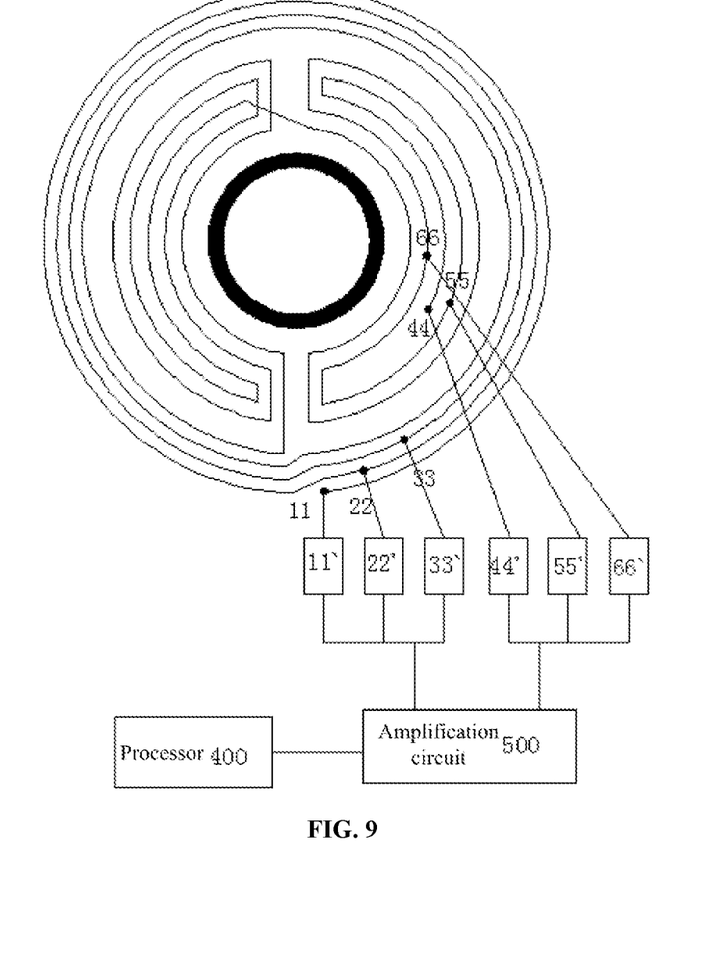
FIG. 9 is a schematic diagram of detection according to Embodiment 2 of the metal sensor of the present invention.

In this embodiment, as shown in FIG. 9, for the apparatus in Embodiment 2, because the second receiving coil 202' and the second receiving coil 202" are disposed generally symmetrically, an output terminal of the second receiving coil 202' is electrically connected to an input terminal of the second receiving coil 202". Other principles are the same as those in the foregoing Embodiment 1, and details are no longer described here.

In general, in the embodiments of the present invention, a large number of turns of coils may be disposed in a relatively small area for the first receiving coil 201 and the second receiving coil 202, and switch devices are disposed at different coil locations of the first receiving coil 201 and the second receiving coils (202, 202', 202"). In this way, calibration can be performed in a relatively large range, the space is significantly saved, the number of disposed switches may be increased, and the adjustment accuracy is improved. Moreover, bidirectional calibration may be achieved for an induced voltage, thereby significantly improving the adjustment accuracy.

In the embodiments of the present invention, an analysis circuit is further included. The analysis circuit includes an operational amplifier and a processor. An output stage of the receiving coil system 200 in the embodiments of the present invention may be connected to the analysis circuit via a switch device. The output stage of the receiving coil system 200 may also be directly connected to the analysis circuit. The following description is based on the connection to the analysis circuit via the switch device. The processor may control the switch device to be turned on or turned off. Another end of the switch device connected to a connecting point on the first receiving coil 201 is connected to an input terminal of an amplification circuit. Another end of the switch device connected to a connecting point on the second receiving coil 202 is connected to an input terminal at the other end of the amplification circuit. One capacitor is connected in series at the input terminal of the amplification circuit, so that the impact of the switch device can be reduced. The output terminal of the amplifier is electrically connected to the processor. For the operational amplifier, an operational amplifier having high input impedance, low noise, and low temperature drift is generally selected.

Line segments of the first receiving coil 201 and the second receiving coil 202 in this embodiment have a planar, single-layer geometrical winding structure. Further, a large number of turns of coils may be disposed in a relatively small area. In the present invention, a large number of turns of receiving coils may be disposed in a relatively small area, and a large number of turns in each coil set are connected to a circuit for the switch devices (1'-6'). In this way, adjustment can be performed in a relatively large range, the space for disposing the turns of receiving coils can be saved, and the length (the number of turns) between adjacent switch devices and the number of switch devices can be adjusted in advance to control the adjustment range and adjustment accuracy. That is, the size of a winding has very high accuracy. There is no technical difficulty in accurately manufacturing a copper structure with a maximum size of 25 millimeters on a circuit board.

Figure 10:
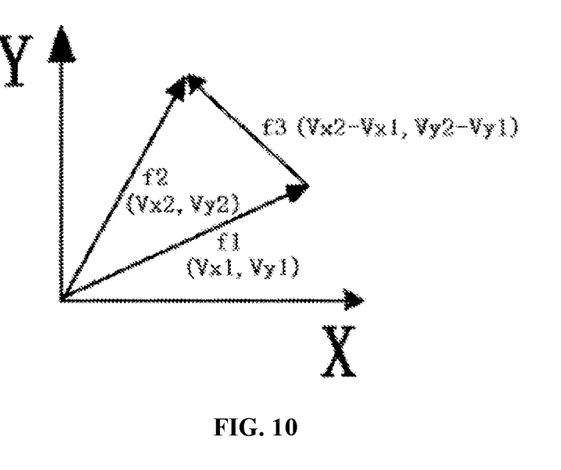
FIG. 10 is a vector diagram of an analysis method according to the present invention.

The present invention uses the following method to analyze a measurement signal of a sensor. The analysis method includes: digitally generating an excitation signal with a frequency F1, driving a transmission coil to generate an alternating magnetic field, and performing phase-synchronized analog/digital conversion on an output signal of a measurement amplifier of an analysis circuit of the sensor, where the phase-synchronized analog/digital conversion on the output signal of the measurement amplifier is performed using the frequency f1=nF1 and a conversion signal is output, where n>2, and n is an integer. Data about whether there is a target is analyzed. When there is no target object, as shown in FIG. 10, spectral analysis is performed on the conversion signal, to obtain a vector of a signal having a frequency F1, which is represented as a vector signal A (Vx1, Vy1) in a complex plane. When there is a target object, spectral analysis is performed on the conversion signal, to obtain a vector of a signal having a frequency F1, which is represented as a vector signal B (Vx2, Vy2) in a complex plane. The vector signal A is subtracted from the vector signal B to obtain a new vector signal C (Vx2−Vx1, Vy2−Vy1). An amplitude change of the vector signal C is analyzed, plane locations 1 and 2 of a first peak value and a second peak value in the amplitude change of the vector signal C are recorded, and midpoint location information of the plane locations 1 and 2 is output as approximate location information of an object in a medium.

When an amplitude of the vector signal C is greater than a set threshold, theoretically, where no object exists, the amplitude of C is 0. That is, a phase does not exist. However, in practice, because of the impact of factors such as noise of a power supply, distribution of receiving coils, noise of an operational amplification circuit, temperature, and humidity, the vector signal C is not 0. It is assumed that the set threshold is W. Because noise is random, a phase is indefinite. In this case, no object exists. When an amplitude of a vector is greater than W, and a phase satisfies a condition, it is considered that an object exists.

In measurement of a same object, phases are different for different circuit parameters or different distributions of receiving coils. Therefore, after a circuit is determined, a metal object with maximum magnetic conductivity and a metal object with minimum magnetic conductivity are measured separately, and phase values of the metal objects are recorded. As such, a phase interval covered by a metal object can be obtained. Therefore, when the amplitude of the vector signal C is greater than W and a phase is in a range covered by a first phase interval, it may be determined that a metal exists. Two end values of the first phase interval are respectively phase values of the vector signal C when an object to be detected is a metal with maximum magnetic conductivity and a metal with minimum magnetic conductivity. Similarly, a magnetic metal with maximum magnetic conductivity and a magnetic metal with minimum magnetic conductivity are measured separately, and phase values of the magnetic metals are recorded. As such, a phase interval covered by an object can be obtained. Therefore, when the amplitude of the vector signal C is greater than W and a phase is in a range covered by a second phase interval, it may be determined that a magnetic metal exists. Two end values of the second phase interval are respectively phase values of the vector signal C when the object to be detected is a magnetic metal with maximum magnetic conductivity and a magnetic metal with minimum magnetic conductivity. Similarly, a nonmagnetic metal with maximum magnetic conductivity and a nonmagnetic metal with minimum magnetic conductivity are measured separately, and phase values of the nonmagnetic metals are recorded. As such, a phase interval covered by an object can be obtained. Therefore, when the amplitude of the vector signal C is greater than W and a phase is in a range covered by a third phase interval, it may be determined that a nonmagnetic metal exists. Two end values of the third phase interval are respectively phase values of the vector signal C when the object to be detected is a nonmagnetic metal with maximum magnetic conductivity and a nonmagnetic metal with minimum magnetic conductivity. In this way, it can be distinguished whether the target object is a magnetic metal or a nonmagnetic metal. Using the analysis method of the present invention, the property of an object to be detected can be accurately obtained, and the accuracy is high.

In this embodiment, the sensor of the present invention detects an object surrounded by a medium by the following detection method. The detection method of the present invention is as follows: a measurement signal is analyzed to obtain property and location information of a surrounded object, the measurement signal is a vector signal obtained through subtraction of a signal generated by a receiving coil end when the sensor is in a detection state and a preset signal, and the preset signal is a signal generated by the receiving coil end of the sensor when no object exists.

When an amplitude of the measurement signal is greater than a set threshold, a determining signal is output showing that an object exists in a medium, and a phase of the measurement signal is analyzed. When the phase of the measurement signal is in a first phase interval, a determining signal is output showing that the object in the medium is a metal, and otherwise, a determining signal is output showing that no metal object exists in the medium. Two end values of the first phase interval are respectively phase values of the measurement signal when an object to be detected is a metal with maximum magnetic conductivity and a metal with minimum magnetic conductivity.

When the amplitude of the measurement signal is greater than the set threshold, a determining signal is output showing that an object exists in the medium, and a phase of the measurement signal is analyzed. When the phase of the measurement signal is in a second phase interval, a determining signal is output showing that the object in the medium is a magnetic metal. Two end values of the second phase interval are respectively phase values of the measurement signal when the object to be detected is a magnetic metal with maximum magnetic conductivity and a magnetic metal with minimum magnetic conductivity. When the phase of the measurement signal is in a third phase interval, a determining signal is output showing that the object in the medium is a nonmagnetic metal. Two end values of the third phase interval are respectively phase values of the measurement signal when the object to be detected is a nonmagnetic metal with maximum magnetic conductivity and a nonmagnetic metal with minimum magnetic conductivity. Using the detection method of the present invention, a magnetic metal and a nonmagnetic metal can also be distinguished according to a phase value.

Figure 11:
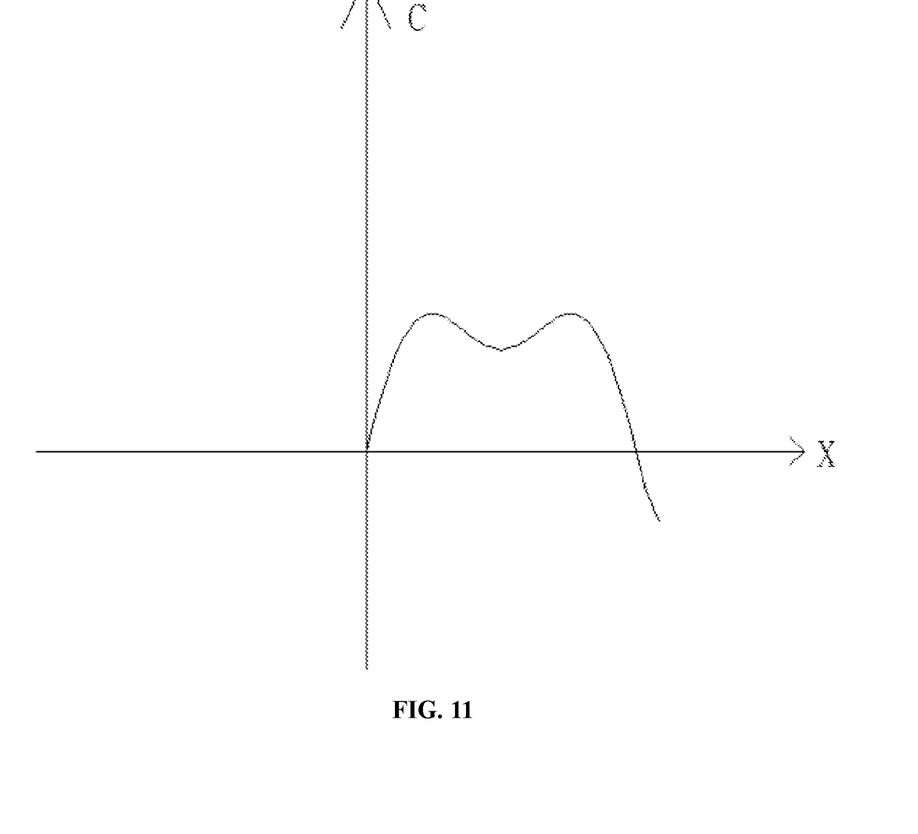
FIG. 11 is a measured curve of a detection signal according to a detection method of the present invention.

Further, an amplitude change of the measurement signal is analyzed, plane locations 1 and 2 of a first peak value and a second peak value in the amplitude change of the measurement signal are recorded, and midpoint location information of the plane locations 1 and 2 is output as approximate location information of the object in the medium. As shown in FIG. 11, using the sensor of the present invention, when there is a target object that is not below the receiving coils, as the receiving coil system is close to the target object, an amplitude of the vector signal C increases, and when the receiving coils are away from the target object, the amplitude of the vector signal C decreases. When a metal moves from an edge of the receiving coils towards the receiving coils, the amplitude of the vector signal C changes from small to large. When the amplitude of the vector signal C suddenly changes from large to small, it is indicated that the object approaches a center point of the second receiving coil. In this case, the point is marked as a start point of a midpoint. When the amplitude of the vector signal C suddenly changes from small to large, it is indicated that the target object is located at a central location of the second receiving coil. When the amplitude of the vector signal C suddenly changes from large to small, it is indicated that the target object is far away from the second receiving coil. In this case, the point is marked as an end point of the midpoint.

The sensor of the present invention can be advantageously integrated with a measurement device. Here, such a measurement device may be especially constructed as a handheld metal locating device, or include a metal locating capability of the sensor of the present invention as an additional function. Additionally and advantageously, the sensor of the present invention may be integrated with a machine tool, for example, integrated with a drilling tool, enabling safe operation of the machine by a user.

The present invention enables a low-cost sensor. The sensor makes as much high-cost parts and device elements as possible superfluous by using a circuit board of the sensor as both a carrier material for an electronic circuit and an integral part of the sensor as a functional part. Only a single coil is needed in the sensor for locating a metal object according to the present invention. Particularly, a lead group on a circuit board of an analysis circuit of the sensor is used to replace a conventional wound receiving coil disclosed in the prior art.

Finally, it should be noted that the foregoing embodiments are merely intended for describing the technical solutions of the present invention rather than limiting the present invention. Although the present invention has been described in detail with reference to the foregoing embodiments, persons of ordinary skill in the art should understand that modifications may be made to the technical solutions described in the foregoing embodiments or equivalent substitutions are made to some technical features therein, and these modifications or substitutions do not cause the essence of respective technical solutions to depart from the scope of the technical solutions of the embodiments of the present invention.

In summary, the foregoing is merely preferred embodiments of the present invention. Any equivalent variations and modifications made according to the claims of the present invention shall fall within the scope of the present invention.

What is claimed is:

1. A method for analyzing a measurement signal of a metal sensor,
   wherein the metal sensor has at least one transmission coil and at least one receiving coil system inductively coupled to each other, the receiving coil system comprising at least one first receiving coil and at least one second receiving coil located in a same plane, and the transmission coil forming a projection on the plane, wherein an area formed by the first receiving coil on the plane contains the projection, an area formed by the second receiving coil on the plane is disposed around the projection, and the first receiving coil is electrically connected to the second receiving coil, wherein one output stage is disposed respectively on the first receiving coil and the second receiving coil and a connecting line between the first receiving coil and the second receiving coil, wherein the metal sensor comprises an analysis circuit, the output stages of the first and second receiving coil being connected to the analysis circuit,
   wherein an excitation signal with a frequency F1 is digitally generated, and phase-synchronized analog/digital conversion is performed on an output signal of a measurement amplifier of the analysis circuit of the sensor and a conversion signal is output, wherein data about whether there is a target is analyzed, when there is no target object, spectral analysis is performed on the conversion signal, to obtain a vector signal A having the frequency F1, when there is a target object, spectral analysis is performed on the conversion signal, to obtain a vector signal B having the frequency F1, and the vector signal A is subtracted from the vector signal B to obtain a new vector signal C,
   wherein when an amplitude of the vector signal C is greater than a set threshold, a phase of the vector signal C is analyzed, when the phase of the vector signal C is in a first phase interval, a determining signal is output showing that a metal object exists in a medium, and two end values of the first phase interval are respectively phase values of the vector signal C when an object to be detected is a metal with maximum magnetic conductivity and a metal with minimum magnetic conductivity,
   wherein when the amplitude of the vector signal C is greater than the set threshold, the phase of the vector signal C is analyzed, when the phase of the vector signal C is in a second phase interval, a determining signal is output showing that a magnetic metal object exists in the medium, and two end values of the second phase interval are respectively phase values of the vector signal C when the object to be detected is a magnetic metal with maximum magnetic conductivity and a magnetic metal with minimum magnetic conductivity; and when the phase of the vector signal C is in a third phase interval, a determining signal is output showing that an object in the medium is a nonmagnetic metal, and two end values of the third phase interval are respectively phase values of the vector signal C when the object to be detected is a nonmagnetic metal with maximum magnetic conductivity and a nonmagnetic metal with minimum magnetic conductivity.

2. The method according to claim 1, wherein the area formed by the first receiving coil on the plane completely contains the projection.

3. The method according to claim 1, wherein the area formed by the first receiving coil on the plane partially contains the projection.

4. The method according to claim 1, wherein the area formed by the second receiving coil on the plane is one area and the area surrounds the projection with an opening.

5. The method according to claim 4, wherein at least two output stages are disposed on the first receiving coil, and at least two output stages are disposed on the second receiving coil.

6. The method according to claim 5, wherein the metal sensor comprises a switch device, wherein the output stages are respectively connected to the switch device.

7. The method according to claim 6, wherein the switch device is an MOS transistor or a bipolar transistor.

8. The method according to claim 7, wherein the metal sensor comprises the analysis circuit, the output stages of the receiving coil system being connected to the analysis circuit via the switch device.

9. The method according to claim 8, wherein the analysis circuit comprises an operational amplifier and a processor.

10. The method according to claim 9, wherein the transmission coil is embedded in a printed circuit board.

11. The method according to claim 10, wherein at least two positioning holes for fixedly installing the transmission coil are disposed on the printed circuit board.

12. The method according to claim 1, wherein at least two areas are formed by the second receiving coil on the plane, and the areas are sequentially distributed around the projection.

13. The method according to claim 1, wherein an amplitude change of the vector signal C is analyzed, plane locations 1 and 2 of a first peak value and a second peak value in the amplitude change of the vector signal C are recorded, and midpoint location information of the plane locations 1 and 2 is output as approximate location information of the object in the medium.

14. A method for detecting an object surrounded by a medium via a metal sensor, wherein the metal sensor has at least one transmission coil and at least one receiving coil system inductively coupled to each other, the receiving coil system comprising at least one first receiving coil and at least one second receiving coil located in a same plane, and the transmission coil forming a projection on the plane, wherein an area formed by the first receiving coil on the plane contains the projection, an area formed by the second receiving coil on the plane is disposed around the projection, and the first receiving coil is electrically connected to the second receiving coil, wherein a measurement signal is analyzed to obtain property and location information of the object surrounded by the medium, the measurement signal is a vector signal obtained through subtraction of a signal generated by a receiving coil end when the sensor is in a detection state and a preset signal, and the preset signal is a signal generated by the receiving coil end of the sensor when no object exists, wherein an excitation signal with a frequency F1 is digitally generated, and phase-synchronized analog/digital conversion is performed on an output signal of a measurement amplifier of an analysis circuit of the sensor and a conversion signal is output, wherein data about whether there is a target is analyzed, when there is no target object, spectral analysis is performed on the conversion signal, to obtain a vector signal A having a frequency F1, when there is a target object, spectral analysis is performed on the conversion signal, to obtain a vector signal B having a frequency F1, and the vector signal A is subtracted from the vector signal B to obtain a new vector signal C, wherein when an amplitude of the vector signal C is greater than a set threshold, a phase of the vector signal C is analyzed, when the phase of the vector signal C is in a first phase interval, a determining signal, is output showing that a metal object exists in the medium, and two end values of the first phase interval are respectively phase values of the vector signal C when the object to be detected is a metal with maximum magnetic conductivity and a metal with minimum magnetic conductivity, wherein when the amplitude of the vector signal C is greater than the set threshold, the phase of the vector signal C is analyzed, when the phase of the vector signal C is in a second phase interval, a determining signal is output showing that a magnetic metal object exists in the medium, and two end values of the second phase interval are respectively phase values of the vector signal C when the object to be detected is a magnetic metal with maximum magnetic conductivity and a magnetic metal with minimum magnetic conductivity; and when the phase of the vector signal C is in a third phase interval, a determining signal is output showing that an object in the medium is a nonmagnetic metal, and two end values of the third phase interval are respectively phase values of the vector signal C when the object to be detected is a nonmagnetic metal with maximum magnetic conductivity and a nonmagnetic metal with minimum magnetic conductivity.

15. The method according to claim 14, wherein an amplitude change of the vector signal C is analyzed, plane locations 1 and 2 of a first peak value and a second peak value in the amplitude change of the vector signal C are recorded, and midpoint location information of the plane locations 1 and 2 is output as approximate location information of the object in the medium.

* * * * *